April 11, 1933.  S. A. WILSON  1,903,652
ICE CREAM FREEZER
Filed June 20, 1931
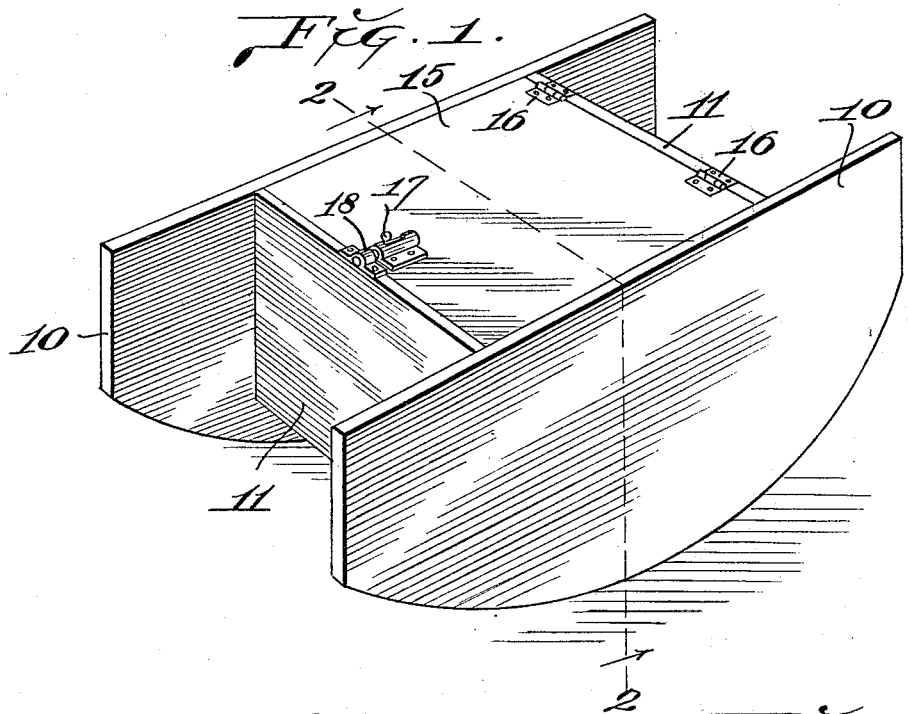
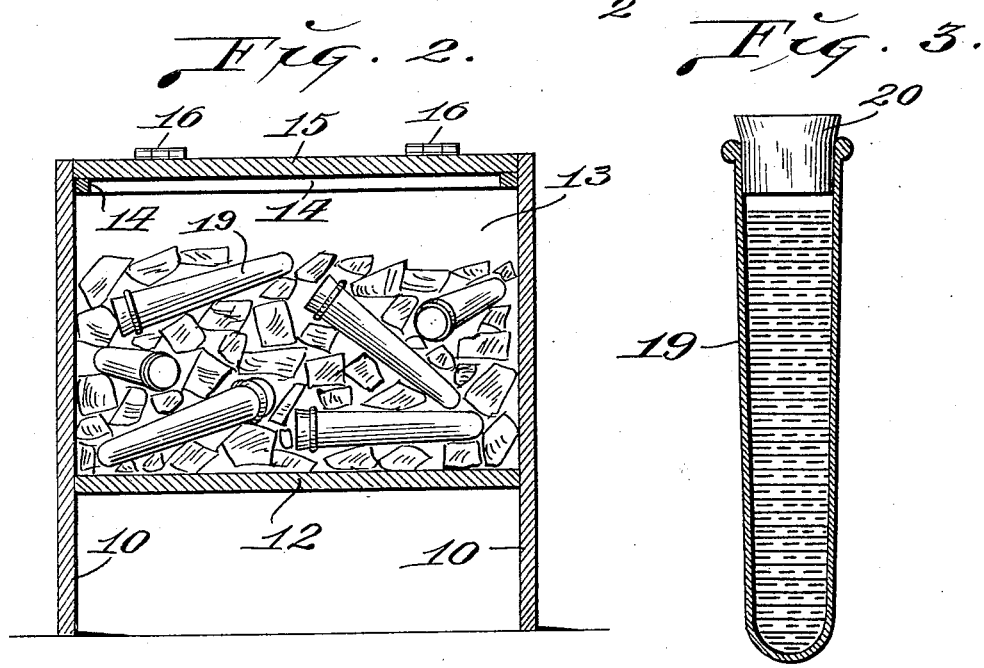
INVENTOR:—
SAMANTHA A. WILSON.
By Martin P. Smith ATTY.

Patented Apr. 11, 1933

1,903,652

UNITED STATES PATENT OFFICE

SAMANTHA A. WILSON, OF BELL, CALIFORNIA

ICE CREAM FREEZER

Application filed June 20, 1931. Serial No. 545,815.

My invention relates to an ice cream freezer and has for its principal object, the provision of a relatively simple, practical and inexpensive device whereby the freezing of confections such as ice cream and ices may be conveniently and rapidly accomplished.

A further object of my invention is, to construct an ice cream freezer that is mounted on rockers so as to materially decrease the bodily efforts that are involved in accomplishing the confection freezing operations.

With the foregoing and other objects in view, my invention consists in certain novel features of construction and arrangement of parts that will hereinafter be more fully described and claimed and illustrated in the accompanying drawing in which:

Fig. 1 is a perspective view of a freezer constructed in accordance with my invention.

Fig. 2 is a cross section taken on the line 2—2 of Fig. 1.

Fig. 3 is a vertical section taken through the center of one of the confection containers that is utilized in my improved freezer.

Referring by numerals to the accompanying drawing which illustrates a practical embodiment of my invention, 10, 10 designate side panels, preferably formed of wood, and the lower edges of which are curved so that said panels will readily rock upon a smooth flat surface such as a floor and arranged between said side panels and inset from the ends thereof are end walls or panels 11.

Arranged between the lower portions of the side panels 10 and between the lower edges of the end walls 11, is a bottom wall or panel 12 and thus a substantially rectangular chamber 13 is formed between the upper portions of the side panels 10 and the end walls 11 and which chamber is adapted to be occupied by broken ice and the containers in which the confection is frozen.

Arranged on the inner faces of the end walls 11 and the side panels 10, just below the upper edges thereof, are rails 14, which form a stop and support for the edges of a door 15 and which latter is connected by suitable hinges 16 to the upper edge of one of the end walls 11.

A suitable latch 17 is arranged on the free edge of door 15 and which latch is adapted to engage a keeper 18 that is positioned on the upper edge of the adjacent end wall 11, thereby providing means for securing the door in closed position.

The containers 19 for the confection that is frozen are preferably formed of sheet metal having tinned or enameled surfaces and said containers being closed at one end and the open end adapted to be closed by a plug or cork such as 20. The containers 19 are preferably tapered slightly toward their closed ends in order to facilitate the removal of the frozen confection.

In the use of my improved freezer, the confection to be frozen is placed in the containers 19 and the corks or plugs 20 are placed in the open ends of said containers so as to effectually close the same.

The containers, together with broken ice, are now placed in the chamber 13, within the freezer, and the latter is placed on a smooth surface and gently rocked so as to agitate the body of broken ice and containers that occupy chamber 13.

The freezer may be rocked by hand or foot after the manner of rocking a cradle and the agitation of the broken ice and the containers resulting from the rocking of the freezer will very quickly freeze the contents of said containers, thereby accomplishing the desired results.

If desired, the freezing operation may be accelerated by sprinkling the broken ice with salt so as to cause said ice to melt more rapidly and thereby lower the temperature of the confection within the containers 19 and consequently bringing about a more rapid freezing of the confection.

After the confection has been frozen and the containers are removed from the freezer, the frozen contents of said containers may be readily removed by placing said containers in water having a temperature substantially higher than the freezing point and such action will raise the temperature of the containers so as to permit the frozen confection to be readily discharged therefrom.

Thus it will be seen that I have provided an ice cream freezer that is relatively simple in construction, inexpensive of manufacture and very effective in performing the functions for which it is intended.

By curving the lower edges of the side panels 10, the freezer may be readily rocked after the manner of a cradle and as a result the freezing operation may be accomplished with comparatively little effort and in a relatively short time.

It will be understood that minor changes in the size, form and construction of the various parts of my improved ice cream freezer may be made and substituted for those herein shown and described without departing from the spirit of my invention, the scope of which is set forth in the appended claim.

I claim as my invention:

An ice cream freezer comprising a pair of side panels provided with curved lower edges that are adapted to rock on a flat surface, end walls arranged between said side panels, which end walls are inset from the ends of said side panels, a bottom wall arranged between the lower portions of said end walls and extending from one side panel to the other, ledges secured to the inner faces of the side panels and end walls a short distance below the upper edges thereof, a cover adapted to close the space between the upper portions of the side panels and end walls, which cover when closed rests snugly upon the ledges, hinges connecting one end of the cover to the upper edge of one of the end walls and a readily releasable latch for securing the free edge of the cover to the upper portion of the other one of the end walls.

In testimony whereof I affix my signature.

SAMANTHA A. WILSON.